United States Patent
Shapira et al.

(10) Patent No.: US 8,934,328 B2
(45) Date of Patent: Jan. 13, 2015

(54) SYSTEM AND METHOD FOR CHANNEL STATE RELATED FEEDBACK IN MULTI-USER MULTIPLE-INPUT-MULTIPLE-OUTPUT SYSTEMS

(75) Inventors: Nir Shapira, Ra'anana (IL); Yaron Shany, Kfar Saba (IL)

(73) Assignee: Celeno Communications Ltd., Ra'anana (IL)

( * ) Notice: Subject to any disclaimer, the term of this patent is extended or adjusted under 35 U.S.C. 154(b) by 418 days.

(21) Appl. No.: 13/100,966

(22) Filed: May 4, 2011

(65) Prior Publication Data
US 2011/0273977 A1    Nov. 10, 2011

Related U.S. Application Data

(60) Provisional application No. 61/330,978, filed on May 4, 2010, provisional application No. 61/334,137, filed on May 12, 2010, provisional application No. 61/361,630, filed on Jul. 6, 2010, provisional application No. 61/412,756, filed on Nov. 11, 2010, provisional application No. 61/431,761, filed on Jan. 11, 2011, provisional application No. 61/425,114, filed on Dec. 20, 2010.

(51) Int. Cl.
*H04J 9/00* (2006.01)
*H04B 7/04* (2006.01)
*H04B 7/06* (2006.01)

(52) U.S. Cl.
CPC ............ *H04B 7/0452* (2013.01); *H04B 7/0658* (2013.01)
USPC ........................................................ 370/204

(58) Field of Classification Search
USPC .................... 375/267, 347, 260, 144; 455/69; 370/204
See application file for complete search history.

(56) References Cited

U.S. PATENT DOCUMENTS

| | | | | |
|---|---|---|---|---|
| 8,374,275 | B2 * | 2/2013 | Yu et al. ......................... | 375/267 |
| 8,385,433 | B2 * | 2/2013 | Wang et al. .................... | 375/259 |
| 8,452,232 | B2 * | 5/2013 | Cho ............................. | 455/11.1 |

FOREIGN PATENT DOCUMENTS

WO    WO2009/002269 A1    12/2008

OTHER PUBLICATIONS

Erez et al. "Capacity and lattice strategies for canceling known interference", IEEE Transactions on Information Theory—TIT, vol. 51, No. 11, pp. 3820-3833, Nov. 2005.

(Continued)

*Primary Examiner* — Chandrahas Patel
(74) *Attorney, Agent, or Firm* — Pearl Cohen Zedek Latzer Baratz LLP (57) ABSTRACT

System and method for dimension reduction and for channel and interference condition feedback in a Multi-User Multiple-Input-Multiple-Output (MU MIMO) wireless communication systems are provided herein. The method for dimension reduction includes determining a number of virtual antennas, $v_k$, for beamformees pertaining to a multi user (MU) transmission group, reducing the dimension of the matrix by selecting a sub-set of antennas or by Eigen mode selection and sending a reduced dimension candidate transmit beamforming matrix or an effective channel matrix to a beamformer. The method for channel and interference condition feedback Interference condition includes sending to a beamformee metric indicative of the interference level from other streams.

23 Claims, 3 Drawing Sheets

(56) References Cited

OTHER PUBLICATIONS

Joonsuk Kim et al, "11ac Explicit Feedback Format, IEEE 802.11-10/1227r0," Nov. 2010.

Junsuk Kim et al, "GroupID Concept for Downlink MU-MIMO Transmission", IEEE 802.11-10/0073, Jan. 18, 2010.

IEEE Std 802.11n-2009, amendment to the IEEE 802.11-2007 wireless networking standard, Oct. 29, 2009.

Shapira et al, MU-MIMO Explicit Feedback Dimension Reduction Procedures, IEEE 802.11-10/1265r1, Nov. 2010.

Shi et al.: "Low Complexity Eigenmode Sekection for MIMO Broadcast Systems with Block Diagonalization", IEEE International Conference on Communications, 2008: ICC '08; May 19-23, 2008, Beijing, China, IEEE, Piscataway, NJ, USA, May 19, 2008, pp. 3976-3981, XP031266068, ISBN: 978-1-4244-2075-9 sections II and III, section IV.

Search Report of Application No. PCT/IL2011/000353 mailed on Dec. 1, 2011.

Notification Concerning Transmittal of International Preliminary Report of Patentability of Application No. PCT/IL2011/000353 mailed on Nov. 15, 2012.

IEEE-Std 802.11, 1999 Edition (ISO/IEC 8802-11: 1999).

IEEE-Std 802.11b-1999 Supplement to 802.11-1999, Wireless LAN MAC and PHY Specifications: Higher Speed Physical Layer (PHY) Extension in the 2.4 GHz Band.

IEEE-Std 802.11a-1999 Higher Speed Physical Layer (PHY) Extension in the 5 GHz Band.

\* cited by examiner

SYSTEM AND METHOD FOR CHANNEL STATE RELATED FEEDBACK IN MULTI-USER MULTIPLE-INPUT-MULTIPLE-OUTPUT SYSTEMS

CROSS REFERENCE TO RELATED APPLICATIONS

This application claims the benefit of U.S. Provisional Application Ser. No. 61/330,978, filed on May 4, 2010 and entitled MULTI-USER TRANSMISSION MODES FOR 11AC, of U.S. Provisional Application Ser. No. 61/334,137, filed on May 12, 2010 and entitled RECEIVER SUBSPACE SELECTION FOR DIMENSION REDUCTION IN MU MIMO SYSTEMS, and of U.S. Provisional Application Ser. No. 61/361,630, filed on Jul. 6, 2010 and entitled DIMENSION REDUCTION TECHNIQUES IN MU MIMO SYSTEMS, of U.S. Provisional Application Ser. No. 61/412,756 filed on Nov. 11, 2010 and entitled FEEDBACK OF SINR AND INTERFERENCE METRICS IN MU-MIMO (SDMA) OPERATION, of U.S. Provisional Application Ser. No. 61/431,761 filed on Jan. 11, 2011 and entitled FEEDBACK OF SINR AND INTERFERENCE METRICS IN MU-MIMO (SDMA) OPERATION, and of U.S. Provisional Application Ser. No. 61/425,114 filed on Dec. 20, 2010 and entitled USING BF SNR METRIC FOR UNUSED DIMENSIONS IN EXPLICIT SOUNDING FEEDBACK, the entire contents of which are incorporated herein by reference.

FIELD OF THE INVENTION

The present invention relates to the field of wireless communication. In particular, embodiments of the present invention relate to multi-user multiple-input-multiple-output systems.

BACKGROUND OF THE INVENTION

Spatial Division Multiple Access (SDMA) is a method of multiplexing several signal streams, each one targeted to a different destination, simultaneously, by utilizing multiple transmit antennas. An SDMA channel access method may enable the use of the same frequency at the same time to communicate with several stations located in different places. For example, an SDMA Access Point (AP) having multiple antennas may use a beamforming technique to transmit to several remote stations simultaneously. Each transmit antenna may transmit the intended signal multiplied by a certain weight, and by dynamically controlling the weights of each antenna the transmission may be directed to a desired location. Under certain assumptions, it can be shown that data transmissions to N user antennas can be multiplexed together using at least N transmit antennas In Multi-User Multiple-Input-Multiple-Output (MU MIMO) communication systems, a multi-antenna transmitter may transmit simultaneously to several multiple-antenna receivers, using SDMA technique. Typically, the problem of designing the TX beamforming vectors, which are typically the beamforming vectors of the AP, is considerably simpler if the total number of receiver antennas, summed over all receivers, is not larger than the number of transmitter antennas.

Designing TX beamforming vectors may require full or partial knowledge of Channel State Information (CSI) of the channel. In explicit sounding exchange, the AP may send a sounding frame from which the intended beamformees may estimate CSI. In sounding feedback, each beamformee can return CSI. This sounding exchange may impose a considerable overhead that may reduce goodput and useful bandwidth of the communication system.

SUMMARY OF THE INVENTION

A according to embodiments of the present invention, there is provided a method for dimension reduction. The method may include sending a matrix related to channel sounding to a beamformer, the matrix has a dimension that is smaller than a maximum dimension. For example, the matrix may be a reduced dimension candidate transmit beamforming matrix, and the maximum dimension may be $N_r \times \min(n_k, N_r)$, where $N_r$ is a number of antennas of the beamformer, and $n_k$ is a number of antennas of the beamformee. For example, the reduced dimension candidate transmit beamforming matrix may be based on a V matrix from a Singular Value Decomposition (SVD) of a matrix selectable from a list comprising: a channel matrix and an effective channel matrix. According to some embodiments of the present invention, the reduced dimension candidate transmit beamforming matrix may sent together with a corresponding SNR vector which conveys per-stream SNR estimation.

Alternatively, the matrix may be an effective channel matrix, and wherein the maximum dimension may be $N_r \times n_k$, where $N_r$ is a number of antennas of the beamformer and $n_k$ is a number of antennas of the beamformee.

Furthermore, according to embodiments of the present invention, the method may include receiving the reduced dimension value from the beamformer, for example, as part of a sounding exchange.

Furthermore, according to embodiments of the present invention, the method may include reducing the dimension of the matrix by selecting a sub-set of antennas. For example, the sub-set may be selected according to Received Signal Strength Indicator (RSSI).

Furthermore, according to embodiments of the present invention, the method may include reducing the dimension of the matrix by Eigen mode selection.

Furthermore, according to embodiments of the present invention, the method may include obtaining a reduced dimension $v_k$, obtaining channel matrix $\hat{H}_k$, performing SVD of the channel matrix $\hat{H}_k$: $\hat{H}_k = UDV^*$, composing a matrix $\tilde{U}$ consisting of the $v_k$ columns of U corresponding to largest singular values, choosing a first stage RX beamforming matrix, $B_k^{(1)}$, to be a conjugate transpose of a matrix based on $\tilde{U}$, for example, $B_k^{(1)} = \tilde{U}^*$, and calculating the effective channel matrix by multiplying the channel matrix by the first stage RX beamforming matrix.

Furthermore, according to embodiments of the present invention, the method may include deducing a final RX beamforming matrix from a MU transmission during reception of the transmission.

Furthermore, according to embodiments of the present invention, there is provided a method for dimension reduction. The method may include determining a number of virtual antennas, $v_k$, for beamformees pertaining to at least one multi user (MU) transmission groups.

Furthermore, according to embodiments of the present invention, the method may include determining a number of virtual antennas, $v_k$, such that a total number of virtual antennas, summed on the beamformees, is not bigger than a number of beamformer antennas, $N_r$.

Furthermore, according to embodiments of the present invention, the method may include conveying the number of virtual antennas, $v_k$ to the beamformees, for example, as part of a sounding exchange.

Furthermore, according to embodiments of the present invention, the method may include sounding the beamformees for matrices related to channel state information (CSI), wherein a dimension of the matrices may be reduced to $v_k$.

Furthermore, according to embodiments of the present invention, the method may include designing TX beamforming matrix based on the matrices, using a TX beamforming matrix design method selectable from a list comprising: zero forcing and block diagonalization.

Furthermore, according to embodiments of the present invention, the matrices may be reduced dimension candidate transmit beamforming matrices. For example, the reduced dimension candidate transmit beamforming matrix may be based on a V matrix from a Singular Value Decomposition (SVD) of a matrix selectable form a list comprising: a channel matrix or an effective channel matrix.

Furthermore, according to embodiments of the present invention, reduced dimension candidate transmit beamforming matrix may be sent together with a corresponding SNR vector which conveys per-stream SNR estimation.

Furthermore, according to embodiments of the present invention, the matrices may be an effective channel matrices.

Furthermore, according to embodiments of the present invention, the method may include assigning an initial number of virtual antennas to the beamformees, and changing the number of virtual antennas during operation according to parameters selectable from a list comprising: traffic buffer status, Received Signal Strength Indicator (RSSI), previous transmission rates and previous Modulation and Coding Schemes (MCSs), partial Channel State Information (CSI), full CSI and resulting overhead from sounding feedback Furthermore, according to embodiments of the present invention, the method may include selecting a subset of antennas for each of the beamformees, conveying the subset to a corresponding beamformee, and sounding the beamformees for a part of their channel matrix related to the subset of antennas.

Furthermore, according to embodiments of the present invention, when resolvable Long Training Fields (LTFs) are used, the method may include sounding full channels between the beamformer and the beamformees, calculating reduced dimension effective channel matrices for the full channels, and designing a TX beamforming matrix based on the reduced dimension effective channel matrices.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

It should be understood that the present invention may be used in a variety of applications. Although the present invention is not limited in this respect, the circuits and techniques disclosed herein may be used in many apparatuses such as personal computers, stations of a radio system, wireless communication system, digital communication system, satellite communication system, and the like.

Stations intended to be included within the scope of the present invention include, by way of example only, Wireless Local Area Network (WLAN) stations, Wireless Personal Area Network (WPAN) stations, two-way radio stations, digital system stations, analog system stations, cellular radiotelephone stations, and the like.

Types of WLAN communication systems intended to be within the scope of the present invention include, although are not limited to, "IEEE-Std 802.11, 1999 Edition (ISO/IEC 8802-11: 1999)" standard, and more particularly in "IEEE-Std 802.11b-1999 Supplement to 802.11-1999, Wireless LAN MAC and PHY specifications: Higher speed Physical Layer (PHY) extension in the 2.4 GHz band", "IEEE-Std 802.11a-1999, Higher speed Physical Layer (PHY) extension in the 5 GHz band" standard, "IEEE Std 802.11n-2009," IEEE 802.11ac standard (e.g., as described in "IEEE 802.11-09/0992r21") and the like.

Types of WLAN stations intended to be within the scope of the present invention include, although are not limited to, stations for receiving and transmitting spread spectrum signals such as, for example, Frequency Hopping Spread Spectrum (FHSS), Direct Sequence Spread Spectrum (DSSS), Orthogonal Frequency-Division Multiplexing (OFDM) and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a Local Area Network (LAN), a Wide Area Network (WAN), or a global communication network, for example, the Internet.

In SDMA operation, a beamformer can transmit a maximum number of spatial streams which may be equal to the minimum between the number of beamformer antennas and total number of beamformees antennas. The channel dimension between the beamformer and each beamformee is $N_r \times n_k$, where $N_r$ is the number of beamformer antennas, and $n_k$ is the number of antennas of the k-th beamformee. The channel dimension, $N_r \times n_k$, may also relate to the dimension of the matrix describing the channel (e.g. the channel matrix). In the present invention, the term dimension reduction relates to the reduction of the $n_k$ dimension to a reduced dimension $v_k$ such that $v_k < n_k$, so that the reduced channel dimension becomes $N_r \times v_k$. Throughout the application, the reduced dimension $v_k$ is also referred to as the number of virtual antennas.

According to embodiments of the present invention, if the total number of beamformee antennas in an MU MIMO transmission group exceeds the number of beamformer antennas, the dimensions of the channel between the beamformer and the beamformees pertaining to the MU transmission group may have to be reduced. The term MU transmission group may relate to a group of beamformees that a beamformer transmits to in a single transmission. For example, the dimension of a channel between a beamformer and a beamformee may be reduced using a first stage RX beamforming matrix. The first stage RX beamforming matrix may be an antenna selection matrix, also referred to as receive chain selection matrix, or a matrix composed from the rows corresponding to the first Eigenmodes of a Singular Value Decomposition (SVD) receive matrix, or any other suitable matrix. In case a first stage RX beamforming matrix is used as part of the channel by multiplying the channel matrix, the resultant channel matrix may be considered as an effective channel matrix and can have a smaller dimension than the original channel matrix. The effective channel may be regarded as a channel between the beamformer antennas and a set of virtual beamformee antennas.

When the total number of beamformee virtual antennas in a MU transmission group is equal or less than the number of beamformer antennas, the beamformer may design its TX beamforming matrix using well known methods, e.g. zero forcing or block diagonalization.

Dimension reduction may also be useful for reducing channel sounding overhead in the case of explicit sounding in which the beamformees report Channel State Information (CSI) back to the beamformer. After dimension reduction operation, the beamformees may report a matrix related to a reduced channel matrix such as an effective channel matrix or candidate TX beamforming matrix.

Figure 1:
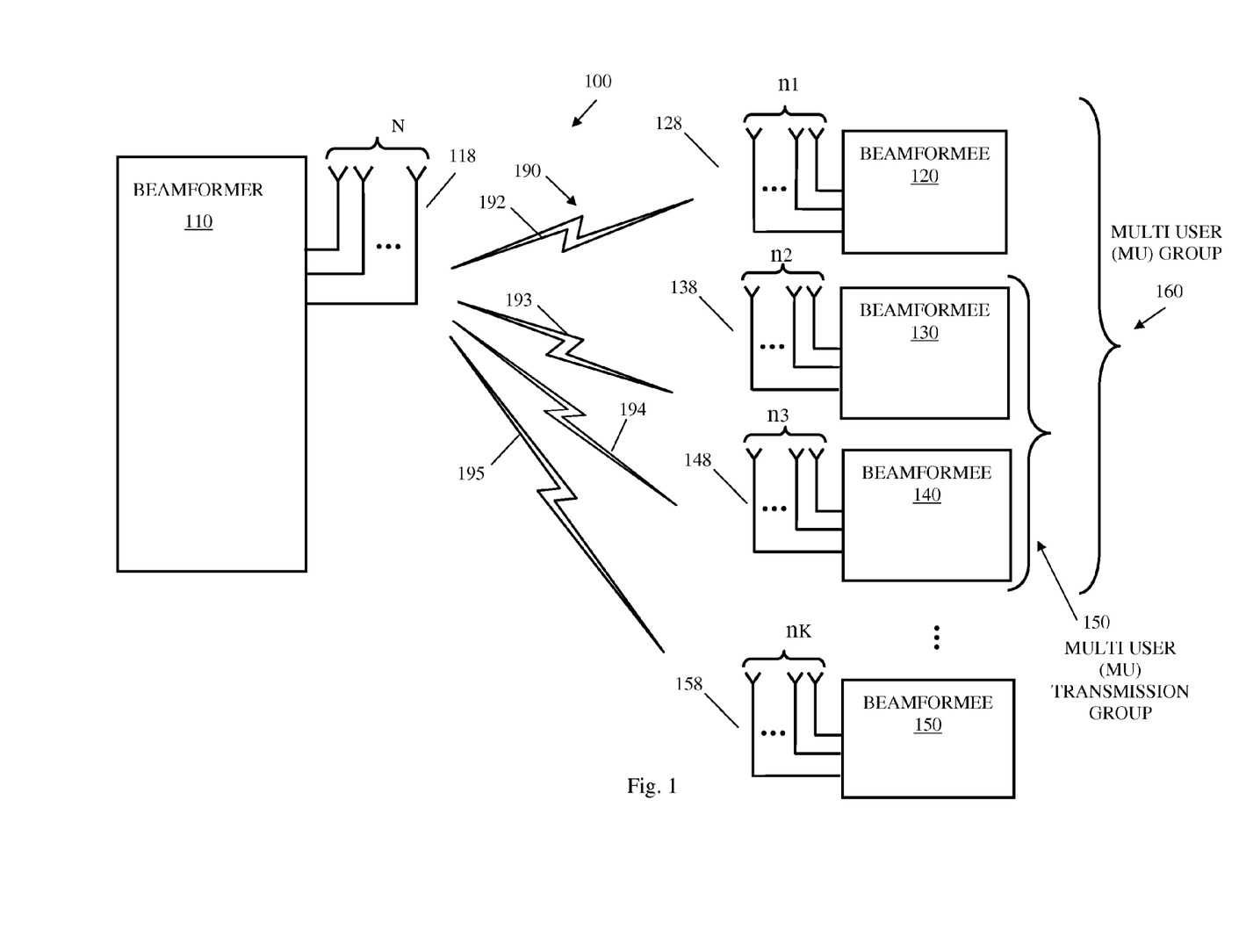
FIG. 1 schematically illustrates a module diagram of an MU MEMO wireless communication system according to embodiments of the present invention.

Reference is now made to FIG. 1 which schematically illustrates a block diagram of an MU MIMO wireless communication system 100 in accordance with demonstrative embodiments of the present invention. It will be appreciated by those skilled in the art that the simplified components schematically illustrated in FIG. 1 are intended for demonstration purposes only, and that other components may be required for operation of the wireless devices. Those of skill in the art will further note that the connection between components in a wireless device need not necessarily be exactly as depicted in the schematic diagram.

MU MIMO wireless communication system 100 may include, for example, one or more wireless Access Points (APs), also referred to as beamformers, e.g., a beamformer 110. Beamformer 110 may have $N_r$ transmit antennas 118, suitable, e.g., for SDMA transmission. System 100 may also include one or more stations (STAB), also referred to as beamformees, e.g., beamformees 120, 130, 140 and 150. Beamformees 120, 130, 140 and 150 may have one or more radio frequency (RF) beamformee antennas 128, 138, 148 and 158, respectively, to receive transmissions from beamformer 110. Some or all of beamformees 120, 130, 140 and 150 may pertain to one or more MU groups, such as MU group 160. A MU group may include several beamformees grouped to a particular SDMA group. For example, MU group 160 may include beamformees 120, 130 and 140. MU transmission group 150 may be different than MU group 160. In each transmission, beamformer 110 may transmit to a MU transmission group, such as MU transmission group 150, which may include all beamformees pertaining to MU group 160, or a subset of the beamformees pertaining to MU group 160. For example, MU transmission group 150 may include beamformees 120 and 130.

Beamformer 110 and beamformees 120, 130, 140 and 150 may be implemented using any suitable combination of memory, hardwired logic, and/or general-purpose or special-purpose processors, as is known in the art. Antennas 118, 128, 138 and 148 may include, for example, an internal and/or external RF antennas, e.g., a dipole antenna, a monopole antenna, an end fed antenna, a circularly polarized antenna, a micro-strip antenna, a diversity antenna, an omnidirectional antenna, a semi-omnidirectional antenna, and/or any other type of antenna suitable for transmission and/or reception of radio frequency signals within a wireless communication network.

According to embodiments of the present invention, beamformer 110 may communicate with one or more of beamformees 120, 130, 140 and 150 via one or more wireless communication channels 192, 193, 194 and 195. Wireless communication channels 192, 193, 194 and 195 may pertain to a whole communication channel 190. Beamformer 110 may transmit to one or more of beamformees 120, 130, 140 and/or 150 via multiple antennas 118 using an SDMA transmission scheme. Beamformees 120, 130, 140 and 150 may be adapted to SDMA operation or may operate according to legacy standards, e.g., IEEE 802.11.

According to embodiments of the present invention, beamformer 110 may communicate with K remote beamformees pertaining to a MU transmission group, having a total number of $N_R$ beamformee antennas, $$N_R = \sum_k n_k,$$

where $n_k$ is the number of antennas of a beamformee. $N_R$ may be larger than the number of beamformer transmit antennas $N_r$. Hence, the dimensions of communication channels between beamformer 110 and the beamformees pertaining to the MU transmission group may be reduced Additionally, the dimension of communication channels between beamformer 110 and the beamformees pertaining to the MU transmission group may be reduced for reducing sounding overheads. Thus the dimension of communication channels between beamformer 110 and the beamformees pertaining to the MU transmission group may be reduced in cases where $N_R \leq N_r$.

For example, in explicit sounding exchange, beamformer 110 may send a sounding frame from which an intended beamformee may estimate the channel matrix. In sounding feedback, the beamformee may return the channel matrix, or alternatively a candidate transmit beamforming matrix, e.g. the V matrix from the SVD of the channel matrix. In case of a candidate transmit beamforming matrix feedback, the maximum dimension of the transmit beamforming matrix may be $N_r \times N_c$, where $N_r$ is the number of beamformer antennas, and $N_c$ is the number of space-time streams directed to the intended beamformee, where $N_c \leq \min(n_k, N_r)$ and $n_k$ is the number of antennas of the intended beamformee. For example, in the preamble of a sounding frame, beamformer 110 may send $N_r$ Long Training Field (LTF) symbols, from which the beamformee may estimate a transmit beamforming matrix of a maximum dimension of $N_r \times \min(n_k, N_r)$. For example, In IEEE 802.11ac, the sounding frame is a Null Data Packet (NDP), that includes only a Preamble part, without any payload. In case of a feedback of the channel matrix, the maximum dimension is $N_r \times n_k$, where $n_k$ denotes the number of antennas of the beamformee.

According to embodiments of the present invention, dimension reduction may relate to the operation wherein a beamformee sends to beamformer 110 a matrix related to the channel state, either a candidate transmit beamforming matrix or a channel matrix, with a dimension which is smaller than the maximum dimension. Typically, the $N_r$ dimension of the candidate transmit beamforming matrix or the channel matrix remains constant, and the $N_c$ dimension of the candidate transmit beamforming matrix or the $n_k$ dimension of the channel matrix may be reduced.

Dimension reduction and designing TX beamforming vectors may require full or partial knowledge of Channel State Information (CSI) of the channels between beamformer 110 and the beamformees pertaining to the MU transmission group, for example, beamformees 130 and 140 pertaining to MU transmission group 150. CSI may be presented in a channel matrix, a candidate transmit beamforming matrix, or in any other applicable form. Beamformer 110 may estimate the full or effective, reduced dimension, channel between transmit antennas 118 to beamformee antennas 128, 138, 148 and 158 by either explicit or implicit channel sounding methods. The term full channel relates to the channel before dimension reduction operation and the term effective channel related to the channel after dimension reduction operation. In explicit sounding exchange, beamformer 110 may send a sounding frame, for example, frame including LTF training symbols, to beamformees 130 and 140, from which beamformees 130 and 140 may estimate their channel matrix. Beamformees 130 and 140 may send either their channel matrix, their effective channel matrix, their candidate transmit beamforming matrix, or their reduced dimension candidate transmit beamforming matrix, back to beamformer 110, for example, in a channel feedback frame. In implicit sounding, beamformer 110 may estimate the downlink, i.e. beamformer to beamformee channel matrix from an uplink, i.e. beamformee to beamformer frame reception and corresponding uplink channel estimate, assuming channel reciprocity.

It should be readily understood by these skilled in the art that beamformees 130 and 140 may send and calculate CSI in any suitable modified or analogous form to the channel matrix. For example, beamformees 130 and 140 may send back a candidate transmit beamforming matrix, together with a corresponding SNR vector which conveys per-stream SNR estimation. The candidate transmit beamforming matrix and the corresponding SNR vector may be calculated based on the estimated channel matrix or the effective channel matrix. For example, the candidate transmit beamforming matrix may be the V matrix from the SVD of the channel matrix $H=U \cdot D \cdot V^*$ sent in an uncompressed or compressed form. Sending the V matrix from the SVD of the channel matrix together with the SNR vector is equivalent to sending the channel matrix. The SNR vector may be equal to the squared diagonal of the D matrix in the SVD of the channel matrix. Since $D \cdot V^* = U^* \cdot H$, and both D and V, or equivalents, are fed back, the feedback may contain the channel matrix H, transformed by a unitary matrix U. Since the communication link may be agnostic to unitary transformations of the channel matrix, the unitary transformation by U is not significant. Thus, the actual channel matrix is effectively fed back. The above discussion applies to the reduced dimension candidate transmit beamforming matrix related to the effective channel matrix.

According to embodiments of the present invention, a reduced dimension candidate transmit beamforming matrix may be derived by first reducing the dimension of the channel matrix and calculating an effective channel matrix and than taking the V matrix from the SVD of the effective channel matrix. Alternatively, a reduced dimension candidate transmit beamforming matrix may be derived by selecting columns from the V matrix of the SVD of the channel matrix.

Channel estimation may be resolvable or non-resolvable. According to non-resolvable channel estimation, LTF training symbols may be sent across a plurality of spatial streams simultaneously. In this case, each of beamformees 120, 130 or 140 may estimate the channel from the beamformer 110 to itself, but not interferences caused by streams destined to other beamformees in MU group 160 that leak into the signal that is received by the beamformee. Hence, in non-resolvable channel estimation beamformer 110 may provide for sufficient separation between streams transmitted to different beamformees to enable proper operation. According to resolvable channel estimation, a separate LTF may be sent per stream, which may enable each of beamformees 120, 130 and 140 to estimate the channel matrix between beamformer 110 to itself, as well as the interference caused by streams destined to other beamformees in the MU group that leak into the signal that is received by the beamformee.

In case beamformer 110 has full channel knowledge, and resolvable LTFs are used for channel estimation, beamformer 110 may make dimension reduction, for example, as a mean for efficient TX beamforming calculation, and need not communicate its decision to beamformees 120, 130 and 140, since the beamformees can estimate the effective dimension of the channel from analyzing the LTFs. However, in case of non-resolvable LTFs, beamformer 110 may have to notify beamformees 120, 130 and 140 on the dimension reduction decision, since beamformees 120, 130 and 140 cannot detect the reduced dimension by themselves and may fail to receive packets.

According to embodiments of the present invention a number of virtual antennas per beamformee k, $v_k$ may be determined for beamformees 130 and 140. The number of virtual antennas of beamformee k, $v_k$, may not be larger than $n_k$, the number of antennas of beamformee k. Typically, the total number of virtual antennas, summed on all beamformees pertaining to a MU transmission group 150, may not be larger than the number of beamformer antennas $N_r$. Beamformees 130 and 140 may determine their number of virtual antennas by themselves, or alternatively, the number of virtual antennas may be determined by beamformer 110.

For example, beamformees 130 and 140 may determine their number of virtual antennas by, for example, calculating the SVD of their channel matrix, and setting the number of virtual antennas to equal the number of dominant eigenmodes, e.g. reduce the dimension of the low SNR eigenmodes.

For example, in case the beamformer determines the number of virtual antennas, beamformer 110 may assign $v_k$ per beamformee by considering Quality of Service (QoS) requirements. For instance, beamformer 110 may assign an initial number of virtual antennas to beamformees 130 and 140. For example, beamformer 110 may initially assign substantially equal $v_k$ to beamformees 130 and 140. For example beamformer 110 having $N_r$ antennas and serving K beamformees may initially assign $\min(n_k, \lfloor N_r/K \rfloor)$ virtual antennas to substantially each beamformee k out of beamformees 130 and 140, where $\lfloor \cdot \rfloor$ denotes rounding to the nearest smaller integer Beamformer 110 may change the assignment dynamically during operation according to instantaneous QoS needs and indications, for example, according to traffic buffer status. Additionally or alternatively, beamformer 110 may consider resulting overhead from sounding feedback to determine priority for $v_k$ assignment. Beamformer 110 may also use second order channel statistics such as Received Signal Strength Indicator (RSSI) to determine priority for $v_k$ assignment. Additionally, beamformer 110 may conclude that some beamformees have better channels than others based on, for example, previous transmission rates or previous Modulation and Coding Schemes (MCSs).

Alternatively, beamformer 110 may assign $v_k$ based on partial or substantially full knowledge of CSI of the channels between beamformer 110 and the beamformees pertaining to the MU transmission group, for example, MU transmission group 150. According to embodiments of the present invention, beamformer 110 may periodically sound beamformees 130 and 140 for their full channel. For example, a single sounding frame may be sent to beamformees 130 and 140 simultaneously, and substantially each beamformee may return in turn its CSI to beamformer 110. Beamformer 110 may sound beamformees 130 and 140 simultaneously for their full channel. Full sounding of beamformees 130 and 140 may provide beamformer 110 with a fully updated channel. A drawback of full sounding may be that a full sounding event may incur a large overhead relative to sounding of a reduced channel. Alternatively, beamformer 110 may periodically sound part of beamformees 130 and 140 for their full channel and the rest for their reduced dimension channel. Different beamformees may be sounded for their full channel in different sounding exchange operations. Partial sounding may not result in a fully updated channel, but may be good enough for the purpose of $v_k$ assignment.

Practically, sounding of a full channel between beamformer 110 and beamformees 130 and 140 in the case where $v_k$ is passed as part of the MU group definition, may be performed by adding a bit in the sounding frame to signify sounding of the full channel. Alternatively, $v_k$ value in the MU group definition may be replaced by $n_k$. Hence the entire channel may be sounded without the need for re-definition of the MU group.

Beamformees 130 and 140 need to know their $v_k$ to make dimension reduction operation. If the number of virtual antennas is determined by beamformer 110, beamformer 110 may have to inform beamformees 130 and 140 of the number of virtual antennas assigned for them. For example, $v_k$ may be passed from beamformer 110 to beamformees 130 and 140 as part of a sounding frame. For example, the sounding exchange in 802.1ac is comprised from the consecutive transmission of two frames. The first frame is an NDP Announcement (NDPA) which indicates that an SIFS (Short Inter Frame Spacing) period after the NDPA an NDP sounding frame will be sent. Since the NDP frame has only preamble and no payload, it cannot carry any information. The dimension reduction information can therefore be carried in the NDPA frame that precedes the NDP, together with any other relevant information, e.g. the list of beamformees. Alternatively, $v_k$ may be a part of the MU group definition, in which case it can be carried in the MU group definition management frame, or $v_k$ may be conveyed to beamformees 130 and 140 by a special control frame or a special management frame.

The dimension of the channel between beamformer 110 and individual beamformees, for example, beamformee 120, may be reduced. For example, the dimension of the returned channel matrix may be $N_r \times v_k$. The reduced dimension of the channel may be determined either by beamformee 120 or by beamformer 110. The dimension of the channel may be reduced by, for example, antenna selection, also referred to as receive chain selection, or by Eigen mode selection, or by other means as well. In case of antenna selection, the selection of the antennas to be reduced may be done by either beamformer 110 or beamformee 120.

For example, beamformee 120 may select a sub-set of $v_k$ antennas out of the $n_k$ beamformee antennas 128. For example, antennas may be selected according to their RSSI.

According to antenna selection, only a sub-set with the size of less than $n_k$ beamformee antennas may be used for substantially each beamformee. In a sounding exchange, beamformees 130 and 140 may send to beamformer 110 the channel matrix corresponding to a sub-set of beamformee antennas.

While working in non-resolvable channel estimation mode, beamformer 110 having $N_r$ antennas can serve up to $N_c$ spatial streams such that the number of spatial streams may not be larger than the number of transmit antennas, $N_c \leq N_r$. The number of spatial streams $N_c$ may typically correspond to up to a total of $N_R$ beamformees antennas, such that the number of spatial streams may not be larger than the total number of all beamformees antennas, and the total number of all beamformees antennas may not be larger than the number of beamformer 110 antennas $N_r$. Thus, for non-resolvable channel estimation mode, typically $N_c \leq N_R \leq N_r$.

In non-resolvable LTF mode, beamformees 130 and 140 may not be able to estimate the interference from other streams. Therefore, if beamformer 110 decides which of beamformee antennas 138 and 148 should be used, then beamformer 110 should typically inform his decision to beamformees 130 and 140. For example, beamformer 110 may use a transmit beamforming matrix, also referred to as precoding matrix to separate beamformees 130 and 140 such that beamformees 130 and 140 may receive a signal at the designated beamformee antennas 138 and 148 that has adequate Signal-to-Interference Ratio (SINR) to enable beamformees 130 and 140 to decode packets received from beamformer 110. Using the transmit beamforming matrix, beamformer 110 may separate the beams, such that for example each of beamformees 130 and 140 may receive substantially the signal intended for that beamformee, with nearly zero interference from the signals intended to other beamformees. In case of antenna selection, this separation may be guaranteed only for the selected antennas. The antennas that were reduced may get a random, channel dependent, superposition of substantially all signals. Beamformer 110 may notify beamformees 130 and 140 which $v_k$ antennas to use for reception of transmission. For example, beamformer 110 may decide which of beamformee antennas 138 and 148 may be used based on knowledge of channel matrixes between beamformer 110 and beamformees 130 and 140. Additionally or alternatively, antenna selection may be based on other suitable parameters, such as RSSI.

According to embodiments of the present invention, while working in resolvable channel estimation mode, beamformer 110 may send downlink LTFs per each stream in a MU group. Beamformees 120, 130 and 140 may know the mapping of stream index to other beamformees, and hence can estimate the interference from other streams and design their receive beamforming matrix to maximize SINR. The beamformee may use receive antennas that were not sounded by beamformer 110 for reception of transmission. Beamformer 110 may decide which beamformee antennas out of those sounded are to be accounted for its TX beamforming matrix calculations. In this case, dimension reduction using antenna selection may be useful mainly for sounding purposes, in which beamformer 110 may select to sound a sub-set of available antennas to save sounding overhead.

According to embodiments of the present invention, a first sub-group of beamformees pertaining to a MU group such as MU group 160 may support non-resolvable channel estimation mode while a second sub-group may support resolvable channel estimation mode. The first sub-group may use non-resolvable LTFs, in which case beamformer 110 may use a precoding matrix to separate beamformees such that they each receive a signal at its designated antennas that has adequate SINR to enable the beamformee to decode the packet, in a similar fashion as was described in the non-resolvable case.

The second sub-group of users may use resolvable LTFs. Beamformer 110 may still provide for adequate separation between beamformees, particularly between beamformees in the first sub-group and the second sub-group. However, in case a beamformee in the second sub-group has more receive antennas than received streams, the beamformee may use the resolvable LTFs for interference suppression. For example, a beamformee may design its receive beamforming matrix such that the beamformee may extract substantially the maximum out of the desired signal while substantially suppressing the interfering signals for a maximum SINR. Beamformees from the second sub-group may use the LTFs to reduce the interference from second sub-group members. It should be noted that Beamformer 110 may need to have CSI of all the participating receive antennas at the beamformees side, even those that use resolvable LTFs, as opposed to the case where all beamformees use resolvable LTFs.

According to embodiments of the present invention, beamformer 110 may use a block diagonalization precoding matrix in, so that the effective channel obtained by multiplying the physical channel by the precoding matrix may have the form::

$$\begin{pmatrix} G_1 & 0 \\ 0 & G_2 \end{pmatrix}$$

Such that the first sub-block $G_1$ (sub-effective-channel) may relate to the first sub-group of beamformees, while the second sub-block $G_2$ may relate to the second sub-group. Sub-blocks $G_1$ and $G_2$ may be in general block diagonal by themselves. Beamformees pertaining to the second sub-group may be able to use multi antennas to reduce the residual interference only of the off-block-diagonal elements in $G_2$. The precoding matrix may be designed to make the stream-to-user-antenna, or stream-to-effective-user-antenna, matrix block diagonal, which means that there is no interference between the two groups. Within the resolvable second sub-group it is conceivable to allow cross-interference between users, thus $G_2$ may not be block diagonal, because beamformees pertaining to the second sub-group may perform interference cancellation. Within the non-resolvable first sub-group, however, significant interference between beamformees is not allowed, and so $G_1$ itself should typically be substantially block diagonal.

In case the dimension of the channel is to be reduced by beamformer 110 using antenna selection, the sub-set of antennas or receive-chains selected may be conveyed to beamformees 120, 130, 140 and 150 as part of the MU group definition or by a special management frame before the actual MU transmission, or as part of the NDPA frame This may enable beamformer 110 to sound beamformees 120, 130, 140 and 150 for a part of their channel matrix related to the sub-set of selected antennas, and may enable beamformees 120, 130, 140 and 150 to disregard the discarded antennas in the case of non resolvable LTFs reception. A bit field per user may be added to the MU group definition frame, wherein each bit corresponds to selection/un-selection of a particular receive chain. An override bit for the antenna selection may be added to the sounding frame, in case beamformer 110 wishes to sound the entire channel without having to re-define the MU group. Alternatively, the receive chain selection information may be added to the sounding frame, which will enable beamformer 110 more flexibility in sounding without the need to re-define the MU group. Alternatively, the receive chain selection information may be included in the preamble of frames, for example, as part of the Signal field. The order of beamformee antennas 128, 138 and 148 in the bit-field may correspond to the antenna order in the CSI explicit feedback from that beamformee. Alternatively, in case of explicit feedback, the order of beamformee antennas 128, 138 and 148 in the bit-field may correspond to the antenna order in the channel sounding frame. Alternatively, beamformee antennas 128, 138 and 148 may be divided into antenna groups; in this case, a bit of the above mentioned bit field may be assigned to antenna groups. An indication of these antenna groups may be conveyed to beamformees 120, 130, 140 and 150 by sending another management frame.

Alternatively, for Eigen mode selection, beamformees 120, 130, 140 and 150 may decompose the channel using SVD, as is the common practice with single user beamforming A beamformee of beamformees 120, 130 and 140, denoted k, may have an estimation $\hat{H}_k$ of its $n_k \times N_r$ channel matrix. Based on $\hat{H}_k$ and $v_k$, the beamformee may choose a first stage RX beamforming matrix $B_k^{(1)}$ which may be a $v_k \times n_k$ matrix. For example, if $\hat{H}_k = UDV^*$ is an SVD of $\hat{H}_k$, and $\tilde{U}$ is the $n_k \times v_k$ matrix consisting of the $v_k$ columns of U corresponding to the largest singular values, then beamformee k may choose a first stage RX beamforming matrix, $B_k^{(1)}$, to be a conjugate transpose of a matrix based on $\tilde{U}$. For example, beamformee k may choose $B_k^{(1)} = \tilde{U}^*$ as the first stage RX beamforming matrix. The first stage RX beamforming matrix $B_k^{(1)}$ may be considered as part of the channel. The beamformee may return the reduced dimension effective channel matrix, $\hat{H}_k^{\mathit{eff}}$, namely the channel matrix multiplied by the first stage RX beamforming matrix $\hat{H}_k^{\mathit{eff}} := B_k^{(1)} \hat{H}_k$ as CSI to beamformer 110. Alternatively, the beamformee may return a reduced dimension candidate transmit beamforming matrix, for example, a V matrix from the SVD decomposition of the effective channel matrix $\hat{H}_k^{\textit{eff}}$, together with a corresponding SNR vector. It should be noted that the reduced dimension candidate transmit beamforming matrix may be calculated directly from the channel matrix, without first calculating the effective channel matrix.

According to embodiments of the present invention, a first stage RX beamforming matrix, $B_k^{(1)}$, may be further manipulated before calculation of $\hat{H}_k^{\textit{eff}}$. For example, $B_k^{(1)}$ may be manipulated to account for various power limitations, such as total power limitation, per-antenna power limitation and EIRP limitation. For example, $B_k^{(1)}$ may be manipulated using optimal MRC vector to account for the total allowed power. It should be noted that other manipulations of $B_k^{(1)}$ made before calculation of $\hat{H}_k^{\textit{eff}}$ are aldo within the scope of the current invention.

In the case beamformees 120, 130 and 140 cannot estimate the interference from other beamformees' streams, e.g. in the case of non-Resolvable LTFs, beamformees 120, 130 and 140 may not be able deduce the dimension reduction information, e.g. final RX beamforming matrix, from the MU transmission itself. Thus, beamformees 120, 130 and 140 may have to store the dimension reduction information from when the reduction took place, and do the same reduction upon MU packet reception. For example, if beamformees 120, 130, 140 and 150 reduce dimension using receive-chain selection, beamformees 120, 130, 140 and 150 should not use the deleted antennas during reception. Similarly, if beamformees 120, 130, 140 and 150 made the reduction using a first stage RX beamforming matrix $B_k^{(1)}$, beamformees 120, 130, 140 and 150 may have to use the same $B_k^{(1)}$ matrix as a first stage RX beamforming matrix during reception. Hence, beamformees 120, 130, 140 and 150 may have to store $B_k^{(1)}$, and use $B_k^{(1)}$ when beamformees 120, 130, 140 and 150 receive an MU transmission. Upon actual MU packet reception, based on beamformer 110 choice of TX beamforming vectors and the effective channel, each beamformee may add a second stage RX beamforming In case beamformees 120, 130, 140 and 150 are able to estimate the interference from streams intended to other beamformees, e.g. in case of Resolvable LTFs, during reception of transmission, beamformees 120, 130, 140 and 150 can deduce the final receive beamforming matrix, taking into account the dimension reduction used to design the transmit (TX) beamforming matrix, from the MU transmission itself, and need not store the dimension reduction information. Thus, in case of resolvable LTFs, there may be no need to store $B_k^{(1)}$. Applying an RX beamforming design method at the beamformee side, such as the optimum MMSE, based on the resolvable LTFs for all streams intended to all beamformees in a transmit MU group, will automatically account for the fact that the TX beamforming matrix was designed based on a channel matrix multiplied by $B_k^{(1)}$ or on corresponding candidate TX beamforming vectors.

According to embodiments of the present invention, beamformer 110 may reduce the dimension of the channel. Reducing the dimension by beamformees 130 and 140 may be sub-optimal since each beamformee may hold only a part of the whole channel between beamformer 110 and beamformees 130 and 140. It stands to reason that beamformer 110, that may have full channel knowledge, can make better decisions. However, due to practical reasons, and since beamformer 110 may not make assumptions on the actual implementation of beamformees 130 and 140, beamformer 110 may utilize simple dimension reduction techniques, such as antenna/receive chain selection. Alternatively, in case sounding overhead of a full channel sounding of the channels between beamformer 110 and the beamformees pertaining to the MU transmission group, may not impose a problem, and for the case of resolvable LTFs, beamformer 110 may sound the full channels between beamformer 110 and the beamformees pertaining to the MU transmission group, calculate reduced dimension effective channel matrices for the channels between beamformer 110 and the beamformees pertaining to the MU transmission group and design the TX beamforming matrix based on the reduced dimension effective channel matrices, as if beamformees 130 and 140 have made dimension reduction. In this case Eigen-mode selection may be used for calculating reduced dimension channel matrices. The term full channel sounding may relate to a sounding exchange with full, not reduced, dimension matrices. In case of resolvable LTFs beamformees 130 and 140 can deduce the reduction from the MU transmission. The dimension reduction operation in this case may take place completely within beamformer 110, without explicitly involving beamformees 130 and 140 in the operation.

After receiving effective channel matrices including first stage RX beamforming matrixes from beamformees 130 and 140, or alternatively getting transmit beamforming matrices based on such an effective channel, beamformer 110 may see an effective channel with less effective receive antennas than the original number of beamformee antennas. Based on the effective channel, beamformer 110 may calculate its TX beamforming matrix, an optional Dirty Paper Coding (DPC) interference cancellation scheme, etc. Beamformer 110 may also choose the number of streams for beamformees 120, 130 and 140, the MCS for each stream of Beamformees 120, 130 and 140, etc.

According to embodiments of the present invention, there may be a second learning stage, in which beamformer 110 may transmit one LTF per stream, enabling beamformees 120, 130, 140 and 150 to learn the post-TX-beamforming virtual channel. The second learning stage may be performed frequently, for example, every frame. In the case of non-resolvable LTFs, if beamformees 120, 130, 140 and 150 stored the above mentioned first-stage beamforming matrices $B_k^{(1)}$, beamformees 120, 130, 140 and 150 may design a second stage beamforming matrix for the post-TX beamforming, post-first stage RX-beamforming virtual channel. In case of resolvable LTFs, beamformees do not have to store any first-stage matrices, and each beamformee designs a single RX-beamforming matrix based on the learned post-TX beamforming channel. For example, this single RX beamforming matrix for user k may be: a Minimum Mean Square Error MMSE receive matrix, also referred to as interference suppression matrix, considering all streams of beamformees 120, 130, 140 and 150 in case of linear processing, a MMSE receive matrix considering only the streams of beamformee k in case of DPC where beamformer 110 cancels interference for all virtual antennas of beamformee k, or other MMSE matrix in case of DPC where beamformer 110 cancels interference for some virtual antennas of beamformee k.

Eigen mode selection may not be optimal since calculation of the first stage RX beamforming matrix of a beamformee may be based substantially solely on the channel of that particular beamformee, but not on the entire channel including all beamformees in a MU transmission group. For example, a beamformee may choose its strongest eigen-modes, which may be the optimal dimension reduction for a single beamformee case. However for multi user, it might be that other, less strong modes are better matched e.g. more orthogonal to other beamformees. However, utilizing DPC-based schemes may improve the performance of Eigen mode selection. Since DPC-based schemes are less sensitive to non-orthogonality of beamformees' channels, the loss caused from dimension reduction made without considering interferences may be smaller.

Dimension reduction may reduce channel sounding overhead in the case of explicit sounding wherein the beamformees report CSI back to the beamformer. Due to dimension reduction, the beamformees can report a smaller channel matrix. In addition, Eigen mode selection may be suitable for both purely linear transmission schemes and mixed linear/non-linear schemes, such as schemes using DPC.

According to embodiments of the present invention dimension reduction procedures as described herein may be adapted for multi-carrier systems having a plurality of subcarriers, such as OFDM communication systems. In multi-carrier systems, each subcarrier may have a corresponding CSI matrix such as channel matrix, candidate transmit beamforming matrix, and reduced-dimension matrix such as effective channel matrix, and reduced dimension candidate transmit beamforming matrix. Additionally, dimension reduction may be performed for any subcarrier for which channel information is sent explicitly.

According to embodiments of the present invention a MU group 160 may be formed just for sounding purposes. Such MU group may be referred to as sounding MU group. For example, in a sounding exchange, beamformer 110 may send a sounding frame to beamformees 120, 130, 140 and 150 including a list indicating which beamformees pertain to a sounding MU group and should be sounded. This may be a separate list then the MU group list.

Adding a separate list of sounded beamformees may increase overhead of specifying beamformees that pertain to a sounding MU group and should return sounding information. However, a separate list of sounded beamformees may enable to separate the sounded beamformees from the MU group. Additionally, adding a separate list of sounded beamformees may allow various options, for example, it may also allow asking for separate sounding formats for different sounded beamformees, even if all sounded beamformees pertain to the same MU group.

According to embodiments of the present invention beamformer 110 may control MCS for beamformees 120, 130, 140 and 150 CSI feedback. This is a powerful tool for further reducing CSI overhead, since beamformer 110 may recommend a MCS having the highest possible throughput reduce overhead. However, if inappropriate MCS is chosen, beamformer 110 may not be able to decode CSI feedback properly.

The information required for determining the correct MCS may be available at beamformer 110 side, but not at beamformees 120, 130, 140 and 150 side. Hence, beamformer 110 may control MCS of CSI feedback by, for example, adding dedicated bits to existing control frames, or by adding a new control frame. In some protocols and implementations there is a mechanism that enables a station to recommend an uplink rate for other stations. For example, in 802.11n/ac, an MCS recommendation is carried in the MCS Feedback (MFB) field as part of the link adaptation protocol. According to embodiments of the present invention, beamformer 110 may have a specific recommendation for sounding feedback frames. This would be separate from other type of recommendations, like the MFB. The reason is that QoS requirements for the sounding feedback may substantially differ from the QoS requirements from other types of uplink traffic, e.g. data packets. The MFB recommendation is general and is usually applied to the data packets.

Figure 2:
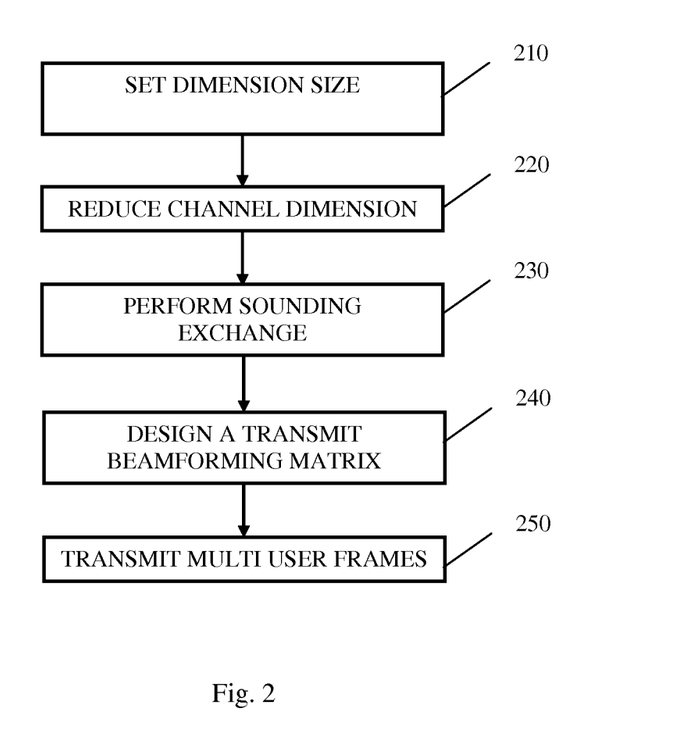
FIG. 2 is a flowchart illustration of a method for dimension reduction according to embodiments of the present invention.

Reference is now made to FIG. 2 which is a flowchart illustration of a method for dimension reduction according to embodiments of the present invention. According to embodiments of the present invention, dimension reduction may be performed in an MU MIMO wireless communication system, for example, an MU MIMO wireless communication system 100 presented in FIG. 1.

According to embodiments of the present invention the dimension can be set for each beamformee by assigning $v_k$ virtual antennas, as indicated in block 210.

In block 220 the dimension of the channel between the beamformer and individual beamformees may be reduced. The dimension of the channel may be reduced either by the beamformee or by the beamformer. The dimension of the channel may be reduced by antenna selection, also referred to as receive chain selection or by Eigen mode selection, as described in detail herein above.

In block 230 a sounding exchange may be preformed. The beamformer may sound an MU transmission group. $v_k$ may already be known to the beamformees or may be a part of the sounding frame. The beamformees may return reduced dimension CSI. In case of non-Resolvable LTFs, the beamformees may have the dimension reduction information and the first stage RX matrix stored. According to embodiments of the present invention, when a beamformee belongs to more than one MU transmission group, that beamformee may be assigned different $v_k$ per MU transmission group, in which case that beamformee may store different reduction information for different MU transmission groups.

In a typical sounding exchange the beamformer may send a sounding frame with a number of LTFs that spans the full dimensions of the whole channel. The beamformer may ask the beamformees to return a reduced dimension channel matrix as a sounding feedback.

According to embodiments of the present invention, in addition to the reduced dimension matrix data, with the accompanied per-tone SNR and average stream SNR, the beamformee would return the per-stream average SNR metric for the full dimension of the channel, i.e. also for the streams that correspond to dimensions that were reduced and are not fed back to the beamformer. The overhead from the additional per-stream SNR values may be negligible.

The beamformer can monitor the per-stream SNR and use it as a trigger for increasing the dimension, or number of virtual antennas, of the beamformee. For example, the beamformer may increase the dimension of a beamformer in which the SNR corresponding to the additional streams is above a threshold. The threshold may be an absolute threshold or relative threshold, determined with relation to the other streams.

In some embodiments, the above threshold can take different values depending on the ratio of the number of beamformer antennas to the number of currently used dimensions in the MU-MIMO system. Usually, a larger ratio will necessitate a smaller SNR threshold.

In block 240 a transmit beamforming matrix may be designed. For example, when the total number of beamformee virtual antennas in a MU transmission group is equal or less than the number of beamformer antennas, the beamformer may design its TX beamforming matrix using well known methods, e.g. block diagonalization.

In block 250 MU frames may be transmitted. For example, the beamformer may transmit MU frames. In case of Resolvable LTFs, the beamformees may identify the MU group index and may extract the appropriate dimension reduction information. In case of non-Resolvable LTFs, the beamformees may have to store the appropriate dimension reduction information and use it upon reception of transmission.

Transmit beamforming matrix may be designed based on CSI returned in a sounding exchange from beamformees 130 and 140. Since CSI estimates may be inaccurate, and since the channel may change with time, using the transmit beamforming matrix based on these inaccurate channel estimates in an MU MIMO operation may lead to unintentional interference between the signals directed to the participating beamformees 130 and 140 in an MU transmission group. Beamformer 110 may be unaware to the actual interference levels at beamformees 130 and 140, and may not know the signal to interference ratio (SINR). The SINR level, or at least a rough indication as to its potential effect, is important for the beamformer to make various decisions on transmission parameters, such as the number of spatial streams per beamformee, the MCS per beamformee, beamformees power allocation, etc. according to embodiments of the present invention, beamformees 130 and 140 may return various metrics indicative of the SINR level, that may help the beamformer to assess the interference status.

Figure 3:
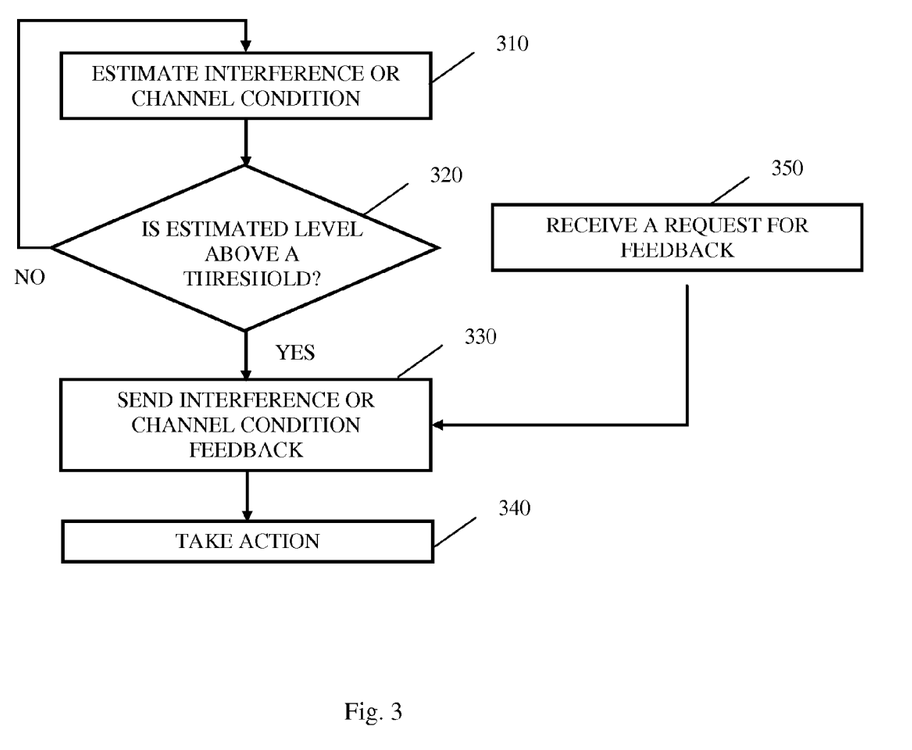
FIG. 3 is a flowchart illustration of a method for channel and interference condition feedback according to embodiments of the present invention.

Reference is now made to FIG. 3 which is a flowchart illustration of a method for channel and interference condition feedback according to embodiments of the present invention. Interference condition may include metric indicative of the interference level from other streams, such as, but not limited to, energy level of other streams, SINR level and MCS recommendation. Channel condition may include any applicable parameter indicative of the channel condition. According to embodiments of the present invention, channel and interference condition feedback may be performed in an MU MIMO wireless communication system, for example, an MU MIMO wireless communication system 100 presented in FIG. 1.

In block 310 channel parameter or interference condition may be estimated. For example, when resolvable LTFs are used, the beamformee may calculate the average energy of each LTF, wherein each LTF corresponds to a particular stream. Some of the streams are intended to the beamformee and the others to other members of the MU group. The energy of the other streams may be a measure of the interference level. This measure can be absolute or relative to the overall energy or to the energy of the intended stream to the beamformee, in which case this ratio is a form of SINR metric. When the beamformer uses zero forcing precoding or block diagonal zero forcing, the energy of the LTFs intended to other beamformees may substantially equal zero. Thus, the actual measured energy of the LTFs intended to other beamformees may be a good indication of the interference magnitude. When other precoding methods, e.g. MMSE, are used, the beamformer can pre-calculate the expected intentional interference magnitude. In case where there is excess interference, the actual interference energy, estimated by measuring the energy of the LTFs corresponding to streams of other beamformees, may be higher than expected. Comparing actual vs. expected LTF energy may give notion of the interference status.

To enable a beamformee to distinguish between the interference signals of each additional stream, the MU-MIMO operation should be in resolvable LTF mode. In case where the MU-MIMO mode is non-resolvable LTF mode, the beamformee may not be able to separate the interference from different streams, and may compute the overall interference level. Hence, the beamformee may send the per-bin or average overall interference for each of beamformee's Eigenmodes or antennas. The feedback metric are not limited to SINR estimates, and may take any form that may help the beamformer to better understand the inter-beamformees interference status.

SINR may be estimated by the beamformee from a single downlink (DL) MU-MIMO reception. In some embodiments, the beamformee may average the interference measured from several DL MU-MIMO receptions.

In block 330 the beamformee may return the channel or interference condition, according to embodiments of the present invention. For example, the beamformee may return the interference energy from each of the additional streams of the other beamformees. The feedback may take the form of a complete interference matrix, showing the per-bin interference of each additional stream on any one of the beamfoemees' Eigen-modes or antennas, or it can be the average interference, averaged on all bins, from each additional stream. The metrics may be returned in a dedicated frame, or alternatively, may be added or piggy backed, to existing fields in other frames, such as the High Throughput Control (HTC or HT control) field in the 802.11n/ac standards. The returned metrics can be a value per stream, or the energy sum of the interfering streams and/or the sum of the intended streams. The energy can be summed over all receive antennas or sent as a value per receive antenna. When sent as a value per receive antenna, problematic antennas may be identified.

The feedback of actual interference/LTF energy has several merits over the feedback of other post processing SINR measures. The latter are often implementation specific, and therefore may not be easy to interpret or to act upon. The energy metric may be simple to calculate and may provide clear and meaningful feedback to the beamformer. For example, it may be relatively straightforward to set a threshold on the suggested energy metric to make various decisions, e.g. dropping the beamformee from the group.

Alternatively, the beamformee may return a MCS recommendation for a MCS that may better suit the current interference level. For example, the beamformee may return a no-MCS recommendation. A no-MCS recommendation may signify that the beamformee cannot accommodate even the lowest possible MCS. Inability of the beamformee to accommodate even the lowest possible MCS may be a result of several channel conditions and other parameters. One of these channel conditions may be that the beamformee receives too much interference from the streams that are directed to other beamformees in the MU group. Having such high interference levels is usually not planned by the beamformer and indicates the precoding matrix used by the beamformer was based on erroneous channel estimate. For example, because of channel aging.

According to embodiments of the present invention, a beamformee may indicate it does not want to belong to the MU group by returning an MCS recommendation of zero. Alternatively, the beamformee may indicate it does not want to belong to the MU group by other means, such as a dedicated field, or dedicated frame. Additionally, the beamformee may feedback its preference to be dropped from the group in unsolicited manner by using a dedicated field or a dedicated frame. In case the beamformee sends indication the beamformee does not want to belong to the MU group in unsolicited manner, the beamformee may signal which MU group is relevant to the unsolicited feedback. Similarly, MCS recommendation by a beamformee may be identified with a particular MU group. In many cases different recommendations may apply to different groups the beamformee participates in, since the signal to interference level may vary between different groups. The indication of the MU group may be added to the Fast Link Adaptation (FLA) mechanism already supported in 802.11n/ac standards.

The interference metric indications and the MCS recommendations may be sent in different frames or times, or they may be sent together in the same frame, as part of the same extended field, to reduce overhead.

The beamformee may return the channel or interference condition as a result of a request from the beamformer, as indicated in block 350. Alternatively, the beamformee may send the channel or interference metrics in unsolicited manner. According to some embodiments of the present invention, the beamformee may return the channel and interference metrics unsolicited if the estimated value is above a certain threshold, as indicated in block 320. By sending the information when a threshold is crossed the overhead from feedback may be minimized, and the feedback may be sent at the time when that feedback is needed. This threshold may be determined by the beamformee or alternatively by beamformer, in which case it should be conveyed to the beamformee. Similarly, a decision to send a no-MCS feedback may be taken if the estimated SINR metric is below a threshold. In case a beamformee feedback their interference metrics in unsolicited manner, the beamformee may signal which MU group is relevant to the unsolicited feedback.

In block 350 a channel or interference condition feedback may be requested. For example, the beamformer may request energy levels of other streams, SINR level or MCS recommendation feedback by sending a dedicated beamformed sounding frame, as opposed to standard non-beamformed sounding frames. This dedicated sounding exchange may elicit the interference metrics feedback from the beamformee.

The interference metrics may be used to verify that the MU-MIMO reception at the beamformee has tolerable interference levels, before actual DL MU-MIMO operation takes place. In case the metrics indicate large interference, the beamformer may want to discard the current TX beamforming matrix and/or take some other action such as, change the members of the MU group, re-allocate the dimensions for the beamformee or re-sound the channel to get a better channel estimate, as indicated in block 340.

Upon reception of interference metric or MCS recommendation feedback from the beamformee, the beamformer may take action to re-sound the channel for this particular beamformee or any other beamformee. The feedback from a beamformee may trigger the beamformer to sound the channel and/or to determine the desired sounding frequency. Typically, the channel may be sounded in a frequency that is somehow proportional to the rate of channel aging. However, channel aging rate is usually unknown to the beamformer. According to embodiments of the present invention, the beamformer may estimate the channel aging rate from the feedback metrics from the beamformees. For example, the beamformer may decide a channel has aged and requires a new sounding when an SINR feedback metric exceeds a certain threshold. Another action may be to select a new MU group that the beamformer believes would result in less interference for each or some of the beamformees.

According to embodiments of the present invention, in response to a dedicated beamformed sounding exchange, the beamformee may return MCS recommendation to the beamformer that may take into account the interference situation. The beamformer may apply these recommendations to subsequent MU-MIMO transmissions.

In case of a no-MCS recommendation, the sooner the beamformer learns of this situation the better. When notified of the no-MCS recommendation the beamformer may take appropriate action, such as removing the beamformee from the MU group, or re-sounding the beamformer for its channel status. Since the beamformer can drop the beamformee from the group, the no-MCS feedback is in a sense a tool for the beamformee to request to be removed from the MU group. The beamformer should therefore return the no MCS recommendation as soon as possible. Usually the earliest opportunity to return the no-MCS recommendation may be in the first possible block acknowledgement (ACK) frame sent by the beamformer, typically, as a response to block ACK request from the beamformer. Thus, it may be desirable that the beamformee respond immediately with the block ACK, a short while after it got the downlink MU-MIMO frame. Therefore, in typical implementations, the beamformee response to no-MCS feedback, as well as other MCS feedbacks may be implemented in hardware (HW) or very fast reacting low level software (SW), since typical SW modules may be too slow.

In a possible embodiments of the present invention, after sending a no-MCS feedback to the beamformer, a beamformee may be assigned zero streams in the next downlink MU-MIMO frames, until the beamformee gets re-sounded and reinserted to the MU group. The beamformer does not have to actually redefine the MU group, instead the beamformer may assign zero streams to the beamformer in question until the beamformer has fresh channel information of the beamformee. Another option is for the beamformer to remove the beamformee from the MU group. In cases where a beamformee returns no-MCS recommendations for most or all of its assigned groups, the beamformer can decide to not serve this client any more in MU mode.

In should be noted that when the beamformer removes the beamformee from the next downlink frames of this group, it might need to change some of the transmit parameters for the other remaining beamformees. The transmit parameters may include the precoding matrix, the MCS, the number of streams, the power allocation per stream etc. A smart beamformer may be able to react fast to the removal of the particular beamformee and change these transmit parameters in a timely manner without the need to re-schedule the frame or delay the transmission of the frame. A simple way to react to this situation is to re-allocate the power that was allocated to the removed beamformee to some or all of the other group members. Alternatively, the beamformer may simply not transmit the signal to the beamformee, while keeping the signals planned for the other group members unchanged. In this way not all of the available power may be used in transmission, but the signal intended for the dropped beamformee may not interfere with the other beamformees. Another option for the beamformer is to immediately switch to transmission of another MU group. This would necessitate the beamformer to maintain a queue of outgoing frames. The frames intended for the problematic MU group, the one for which a no-MCS feedback was received, may be re-scheduled for transmission after appropriate action is taken by the beamformer, e.g. resounding of group members. Another option for the beamformer is to switch to single beamformee transmission mode until appropriate action is taken. In this option the outgoing frames are transmitted according to their original planned order.

In many cases the level of interference may be such that the beamformee cannot decode correctly the downlink packet, resulting in a frame Cyclic Redundancy Check (CRC) failure. In these cases, the beamformee may still be able to decode the packets' preamble and discern the reason for failure, for example, discern if the failure is due to inter-stream interference or due to another reason, which may be, for example, an erroneous rate selection decision by the beamformer or by interference from other STAs. An indication for the robustness of the information extracted from the LTFs may be that the CRC of the preamble Signal field is OK. The information extracted from the LTFs may be, for example, a no-MCS decision, the LTF energy, or any other related metric. The Signal field is usually transmitted before the LTFs as part of the frame preamble and is encoded in a low rate in single user mode, such that most beamformees should be able to decode it even if the inter-stream interference resulting from bad precoding prevents the beamformees from decoding the rest of the packet. For example, in 802.11ac there are two Signal fields, the first of which is termed VHT-SIG-A. VHT-SIG-A is not beamformed and is directed to all beamformees in a single user mode. It is transmitted before the LTF symbols. The Signal field has a CRC sub-field that protects the content of the Signal field. This is a different CRC than the one used for protecting the entire frame. When a beamformee is able to decode the Signal field with a good CRC, the beamformee knows the mapping of each subsequent LTF to stream, and knows which are intended to its own streams and which are for other beamformees in the MU group. The beamformee should therefore be able to generate the feedback metric, e.g. no-MCS, LTF energy etc. When the beamformee returns the information it might want to signal that the Signal field was decoded correctly, so the beamformer would know the returned metrics are not corrupted. An indication on a successful Signal field CRC can therefore be part of the feedback information. Alternatively, the beamformee can send back a no-Recommendation feedback, which means it could not get uncorrupted metric information.

Some embodiments of the present invention may be implemented in software for execution by a processor-based system, for example, beamformer 110 and beamformees 120, 130, 140 and 150. For example, embodiments of the present invention may be implemented in code and may be stored on a nontransitory storage medium having stored thereon instructions which can be used to program a system to perform the instructions. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for dimension reduction, the method comprising:
  sending at least one matrix related to channel sounding to a beamformer, said matrix has a dimension that is smaller than a maximum dimension, wherein the channel sounding is defined between a beamformer and beamformees, wherein said matrix is based on a channel matrix of said channel sounding, wherein said maximum dimension is the dimension of the channel matrix, and wherein the matrix is calculated effectively on a reduced dimension channel matrix,
  wherein the beamformer has informed the beamformee of a value of the reduced dimension channel matrix prior to the sending of the reduced dimension channel matrix by the beamformee,
  wherein said calculating is executed by a computer processor.

2. The method of claim 1, wherein said matrix is a reduced dimension candidate transmit beamforming matrix, and wherein said maximum dimension is $N_r \times \min(n_k, N_r)$, where $N_r$ is a number of antennas of said beamformer, and $n_k$ is a number of antennas of said beamformee.

3. The method of claim 2, wherein said reduced dimension candidate transmit beamforming matrix is based on a V matrix from a Singular Value Decomposition (SVD) of a matrix selectable from a list comprising: a channel matrix and an effective channel matrix.

4. The method of claim 3, wherein said reduced dimension candidate transmit beamforming matrix is sent together with a corresponding SNR vector which conveys per-stream SNR estimation.

5. The method of claim 1, wherein said matrix is an effective channel matrix, and wherein said maximum dimension is $N_r \times n_k$, where $N_r$ is a number of antennas of said beamformer and $n_k$ is a number of antennas of said beamformee.

6. The method of claim 1, further comprising:
  deducing a final RX beamforming matrix from a MU transmission during reception of said transmission.

7. The method of claim 1, wherein instructing the beamformee of a value of the reduced dimension channel matrix is carried out as part of a sounding exchange.

8. The method of claim 1, further comprising:
  reducing the dimension of said matrix by selecting a subset of antennas.

9. The method of claim 1, further comprising:
  reducing the dimension of said matrix by Eigen mode selection.

10. A method for dimension reduction, the method comprising:
  determining a number of virtual antennas, $v_k$, for beamformees pertaining to at least one multi user (MU) transmission groups wherein resolvable Long Training Fields (LTFs) are used, the method further comprising:
  sounding full channels between said beamformer and said beamformees;
  calculating reduced dimension effective channel matrices for said full channels; and
  designing a TX beamforming matrix based on the reduced dimension effective channel matrices,
    wherein said calculating is executed by a computer processor.

11. A method for dimension reduction, the method comprising:
  sending a matrix related to channel sounding to a beamformer, said matrix has a dimension that is smaller than a maximum dimension by:
  obtaining a reduced dimension $v_k$;
  obtaining channel matrix $\hat{H}_k$;
  performing SVD of said channel matrix $\hat{H}_k$: $\hat{H}_k = UDV^*$;
  composing a matrix $\tilde{U}$ consisting of the $v_k$ columns of U corresponding to largest singular values;
  choosing a first stage RX beamforming matrix, $B_k^{(1)}$, to be a conjugate transpose of a matrix based on $\tilde{U}$; and calculating said effective channel matrix by multiplying said channel matrix by said first stage RX beamforming matrix,
wherein said calculating is executed by a computer processor.

12. The method of claim 11, wherein $B_k^{(1)} = \tilde{U}^*$.

13. A method for dimension reduction of a channel matrix sent by a beamformee, the method comprising:
determining a number of virtual antennas, $v_k$, for beamformees pertaining to at least one multi user (MU) transmission groups;
conveying said number of virtual antennas, $v_k$ from a beamformer to said beamformees,
wherein said number of virtual antennas, $v_k$ indicates a size of the reduced dimension channel matrix sent by the beamformee;
sounding channels between a beamformer and said beamformees;
calculating reduced dimension channel matrices for said channels; and
designing a transmit beamforming matrix based on the reduced dimension channel matrices,
wherein said calculating is executed by a computer processor.

14. The method of claim 13, further comprising:
assigning an initial number of virtual antennas to said beamformees; and
changing said number of virtual antennas during operation according to parameters selectable from a list comprising: traffic buffer status, previous transmission rates and previous Modulation and Coding Schemes (MCSs), partial Channel State Information (CSI), full CSI and resulting overhead from sounding feedback.

15. The method of claim 13, wherein said determining a number of virtual antennas, $v_k$, is done such that a total number of virtual antennas, summed on said beamformees, is not bigger than a number of beamformer antennas, $N_r$.

16. The method of claim 13, further comprising:
selecting a subset of antennas for each of said beamformees;
conveying said subset to a corresponding beamformee; and
sounding said beamformees for a part of their channel matrix related to said subset of antennas.

17. The method of claim 13, wherein the conveying of said number of virtual antennas, $v_k$ is from said beamformer to said beamformees as part of a sounding exchange.

18. The method of claim 13, further comprising:
sounding said beamformees for matrices related to channel state information (CSI), wherein a dimension of said matrices is reduced to $v_k$.

19. The method of claim 18, further comprising:
designing TX beamforming matrix based on said matrices, using a TX beamforming matrix design method selectable from a list comprising: zero forcing and block diagonalization.

20. The method of claim 19, wherein said reduced dimension candidate transmit beamforming matrix is based on a V matrix from a Singular Value Decomposition (SVD) of a matrix selectable form a list comprising: a channel matrix or an effective channel matrix.

21. The method of claim 20, wherein said reduced dimension candidate transmit beamforming matrix is sent together with a corresponding SNR vector which conveys per-stream SNR estimation.

22. The method of claim 18, wherein said matrices are reduced dimension candidate transmit beamforming matrices.

23. The method of claim 18, wherein said matrices are an effective channel matrices.

* * * * *